(12) United States Patent
DeJaco et al.

(10) Patent No.: US 6,745,024 B1
(45) Date of Patent: Jun. 1, 2004

(54) SYSTEM AND METHOD FOR PREPARING AND SENDING AN ELECTRONIC MAIL COMMUNICATION USING A WIRELESS COMMUNICATIONS DEVICE

(75) Inventors: Andrew P. DeJaco, San Diego, CA (US); Charles S. Han, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/480,835

(22) Filed: Jan. 10, 2000

(51) Int. Cl.$^7$ .................. H04M 3/533; H04Q 7/22; G06F 13/38
(52) U.S. Cl. .............. 455/414; 709/206; 709/207; 709/217
(58) Field of Search .............. 455/414; 709/206, 709/217, 207

(56) References Cited

U.S. PATENT DOCUMENTS

| | | | |
|---|---|---|---|
| 5,414,796 A | 5/1995 | Jacobs et al. | 395/2.3 |
| 5,600,754 A | 2/1997 | Gardner et al. | 395/2.3 |
| 5,974,449 A * | 10/1999 | Chang et al. | 709/206 |
| 6,185,288 B1 * | 2/2001 | Wong | 370/352 |
| 6,256,666 B1 * | 7/2001 | Singhal | 709/203 |

FOREIGN PATENT DOCUMENTS

| | | | |
|---|---|---|---|
| WO | 94/23394 | 10/1994 | |
| WO | 00/59196 | 10/2000 | |
| WO | WO 00/59196 * | 10/2000 | H04M/3/533 |

OTHER PUBLICATIONS

Shung-Foo Yu et al. "A multimedia gateway for phone/fax and MIME mail," Computer Communications, NL, Elsevier Science Publishers BV, Amsterdam, vol. 20, No. 8, Aug. 25, 1997, pp. 615–627.

* cited by examiner

Primary Examiner—William Cumming
Assistant Examiner—Alan T. Gantt
(74) Attorney, Agent, or Firm—Philip Wadsworth; Kent D. Baker; Donald C. Kordich

(57) ABSTRACT

A system and method for preparing and sending e-mail communications using a wireless communications device are disclosed. In one embodiment, input data comprising audio, image, and/or video data is encoded and transmitted to a cellular network. An integrated e-mail processor connected to the cellular network processes the coded data into a composite e-mail message and forwards the message to a server. The server then forwards the composite e-mail message to the indicated recipient(s). In another embodiment, the wireless communications device processes the coded data into a composite e-mail message and forwards it to a server via a cellular network. In either embodiment, the server may be dedicated to the cellular network. The invention thus enables users of handheld wireless communications devices, users of other devices lacking typing keyboards, or users presently unable to use a typing keyboard to prepare and send e-mail messages.

32 Claims, 12 Drawing Sheets

SYSTEM AND METHOD FOR PREPARING AND SENDING AN ELECTRONIC MAIL COMMUNICATION USING A WIRELESS COMMUNICATIONS DEVICE

BACKGROUND OF THE INVENTION

1. Field of the Invention

This invention relates to wireless communications. More specifically, this invention relates to electronic mail communications using a handheld wireless communications device.

2. Description of Related Art and General Background

A. Electronic Mail

Communication using electronic mail (hereinafter "e-mail") has several advantages which have helped to fuel the recent exponential growth in e-mail usage. An e-mail message may be sent around the world substantially instantly, without incurring any long-distance telephone tolls or postage charges or delays. An e-mail message is also more tangible than a telephone call, as an exact copy of the transmission remains available for future reference by both the sender and the recipient. An e-mail transmission may easily be encrypted for security and can also be authenticated to ensure the integrity of the received message and the identity of the sender. It is also much easier to send an e-mail transmission to multiple recipients simultaneously than to send multiple letters or conduct a conference call or a series of calls. Additionally, e-mail messages may be preferable over telephone calls in situations where only one-way communication is desired. With the advent of easy-to-use software applications, e-mail has become a convenient and inexpensive way to communicate.

Initially, e-mail communication was limited to users connected within a particular network. Today, the Internet provides a communications pathway between users in separate and unrelated networks. As a result, e-mail transmissions may be exchanged between any two users who each have an established e-mail account on a server connected to the Internet. As shown in FIG. 1, each of the users D–G using computers 10c and 10d may correspond with any of the other users via servers 20a and 20b (which service the users' e-mail accounts) and the Internet 250. Additionally, data modems 15a and 15b coupled to computers 10a and 10b, respectively, allow the connection between users to extend beyond the Internet 250 to include data links over the public switched telephone network (PSTN) 230, such that users A–C using computers 10a and 10b and their accounts on server 20a may correspond with any of the other users as well.

Common standards and protocols exist that enable e-mail and other forms of communications to be conducted over the Internet across a wide variety of software applications, computing platforms, and transmission channels. One such protocol, the Simple Mail Transfer Protocol (SMTP), is the standard method for transferring electronic mail over a network and is defined in "Simple Mail Transfer Protocol" by J. Postel, RFC 821, University of Southern California/Information Sciences Institute, August 1982. Because SMTP can be used to communicate across different platforms, it enables users of disparate systems to exchange e-mail messages transparently. For example, a researcher using a supercomputer running under a UNIX operating system can send the same e-mail message to a colleague on the same supercomputer, a co-worker in a different building using a different server and operating system, and a friend using a personal computer from home. A software routine or "layer" running on each of the latter two systems receives an SMTP transmission containing the message and handles it appropriately, allowing the researcher to transmit her message without regard to the nature or configuration of any recipient's system.

In FIG. 1, a message sent by user B to user G might typically be delivered in three SMTP transmissions. In the first transmission, the message is transmitted by computer 10a to server 20a over the PSTN 230. In the second transmission, the message is transmitted by server 20a to server 20b over the Internet 250. In the third transmission, the message is transmitted by server 20b to computer 10d over a local-area network connection such as an Ethernet link. In each case, the SMTP transmission is carried across a Transmission Control Protocol (TCP) connection, which is sustained only during the length of the transmission.

A message passes from a transmitting system to a receiving system via SMTP as shown in FIGS. 2A and 2B. The mail transaction is initiated when the SMTP layer executing on the transmitting system (hereinafter "Transmitter-SMTP") establishes communication with the SMTP layer executing on the receiving system (hereinafter "Receiver-SMTP") as shown in block P005. In block P010, the Transmitter-SMTP sends a MAIL command to the Receiver-SMTP. This MAIL command instructs the Receiver-SMTP to reset all of its state tables and buffers and also identifies the sender, whose mailbox address appears in a reverse-path argument. If the Receiver-SMTP can accept mail, shown in the decision block P015, the Receiver-SMTP responds by transmitting an OK command as in block P025. Otherwise, the Receiver-SMTP rejects the mail as in block P020.

Once the Receiver-SMTP acknowledges that it can accept mail, the Transmitter-SMTP issues the RCPT command, which contains a forward-path argument that identifies the mailbox of one recipient, as shown in block P030. This process may be repeated several times, as SMTP provides the user with the ability to send the same message to multiple recipients. If the Receiver-SMTP can recognize the mail addressee as in decision block P035, the Receiver-SMTP transmits an OK command as in block P045. Otherwise, the Receiver-SMTP rejects the, unrecognized addressee as in block P040. The Receiver-SMTP processes any remaining addressees in a similar manner, shown in decision block P050 and blocks P070–P085 (corresponding to blocks P030–P045).

When the last addressee is processed, the Transmitter-SMTP sends the body of the message to the Receiver-SMTP, as shown in block P055. A DATA command defines the body of the mail message. The Receiver-SMTP treats the incoming data as message text until it detects an end-of-text signal, which comprises a line containing only a period. In block P060, the Transmitter-SMTP supplies the end-of-text signal. The Receiver-SMTP acknowledges this signal with an OK command as in block P065.

In addition to mail transmission, SMTP also supports features for address verification and correction, including supplying an address for e-mail forwarding and verifying and expanding a user's name or mailing list. Moreover, SMTP also supports delivering messages to a user's terminal instead of the user's mailbox.

B. Attachments to E-Mail Transmissions

In traditional paper mail, a sender may enclose other documents, and even non-textual materials such as photographs, into the same envelope as a letter. E-mail transmissions, however, were originally limited to text. While SMTP is effective in bridging the gap between different computer platforms, control and data sequences within the SMTP layer must be composed entirely of the 128 characters of the ASCII character set.

Eventually, standardized methods for converting non-textual information into ASCII were developed, allowing the creation of software packages that provide users with the ability to attach non-textual material to an e-mail communication. One such method that has become a universal standard is uuencode (originally for 'UNIX-to-UNIX encode'). Another standard used primarily on Apple Macintosh computers is BinHex (for 'binary hexadecimal'). The ability to use attachments has expanded the power and utility of e-mail, as a user may now send audio data, image or video files, or any other file created with any computer application as e-mail.

Recently, the Multipurpose Internet Mail Extensions (MIME) protocol has become an Internet standard for attaching materials to e-mail transmissions. This protocol is defined in the following documents entitled "Multipurpose Internet Mail Extensions": RFC 2045 (Part One), RFC 2046 (Part Two), and RFC 2049 (Part: Five) by N. Freed and N. Borenstein; RFC 2047 (Part Three) by K. Moore; and RFC 2048 (Part Four) by N. Freed, J. Klensin, and J. Postel, University of Southern California/Information Sciences Institute, November 1996. A variation of MIME called S/MIME also includes encryption for security against eavesdroppers and imposters.

MIME uses header fields to identify the type of content and the method of encoding. Content type arguments that may appear in the header include 'image,' 'audio,' 'text,' 'video,' and 'application,' a catch-all category that includes other content types. Several kinds of encoding may be used, including seven-bit, quoted-printable and Base64. Seven-bit encoding is used for files containing all ASCII data. Quoted-printable encoding is used for mostly ASCII text with few binary characters, as found in enhanced text documents such as those formatted in Microsoft's Rich Text Format (RTF). Base64 encoding is used for files that contain a significant amount of binary data, such as audio data, image files, and videos. Additional descriptions of the data in the message body may be provided in the Content-ID and Content-Description header fields. A single message may contain several parts of different data types, in which case a boundary marker is used to separate the different parts of the message. The MIME protocol thus provides a standardized method for transmitting files by e-mail in such a way that each file may be automatically associated with its proper application at the receiver.

In Base64 encoding, the first step is to format the binary data into groups of three bytes (i.e. 24 bits). Each 24-bit group is then divided into four subgroups of six bits. Next, leading zeros are prefixed to each sub-group of six bits to create a group of four new bytes, each representing an ASCII character. As a result, the file is converted to a form that can be transported via SMTP regardless of the application that was used to produce the file.

C. Digital Audio Formats

One way to store and transmit sound in digital form is simply as a sequence of samples, where a predetermined period of time passes between each sampled point and the value of each sample is stored at a predetermined resolution. The WAV (for 'waveform audio') file format, for example, defines sound sampled (or digitally created) at either 8-bit or 16-bit resolution and at a rate of either 11.025, 22.050, or 44.100 kHz. Commercial audio compact disc (CD) recordings contain sound sampled at resolution of 16 bits/sample and a rate of 44.100 kHz.

Direct transmission or storage of sound can be very expensive. For example, sampling an analog sound at 16-bit resolution at a rate of 44.100 kHz produces 706 kilobits of data per second. Even sampling at 8-bit resolution at a rate of only 11.025 kHz (i.e. limited to a maximum frequency of approximately 5500 Hz) produces 88 kilobits of data per second. In wireless communications applications, the available bandwidth is too limited and expensive to permit such data rates, and it is necessary to significantly reduce the amount of data that must be transferred. Linear predictive coding (LPC), a technique which anticipates the future form of a signal from its past form, is commonly used for compressing voice data in digital wireless communications. An LPC voice coder (or 'vocoder') analyzes speech according to a model of the human vocal tract, identifying the code parameters that are shipped to the receiver and used to reconstruct the spoken sounds.

Use of LPC is more efficient in transmitting voice data than direct sampling formats such as WAV. The difference between the two techniques can be demonstrated most dramatically by considering how each one handles a period of silence (which one might expect to comprise about one-half of a typical two-way telephone conversation). In LPC, a period of silence produces few parameters to transmit or store. In direct sampling formats, on the other hand, a period of silence is sampled like any other period, and the data rate remains the same.

One variant of LPC known as code-excited linear prediction (CELP) produces a higher ratio of voice signal quality to bit rate by tracking the errors between the original speech and the computer-generated model. CELP utilizes a code book that is used to decode the errors at the receiver's end, resulting in much higher quality of prediction. Even better results (data rates of 1 to 8 kilobits per second) can be achieved by using variable-rate variants as, for example, described in U.S. Pat. No. 5,414,796, entitled "VARIABLE RATE VOCODER," issued May 9, 1995 and assigned to the assignee of the present application, and/or techniques for error correction and control as, for example, described in U.S. Pat. No. 5,600,754, entitled "METHOD AND SYSTEM FOR THE ARRANGEMENT OF VOCODER DATA FOR THE MASKING OF TRANSMISSION CHANNEL INDUCED ERRORS," issued Feb. 4, 1997 and assigned to the assignee of the present invention.

D. Wireless Data Communications

Voice and data may be transmitted over a wireless link in either analog or digital form. Although analog systems are currently more ubiquitous, digital techniques enable wireless service providers to increase the capacity of their systems by using time-division and code-division multiple access techniques.

A single wireless network may support voice and data services over the same frequency band or over separate frequency bands. Wireless networks also exist that are dedicated primarily or entirely to either voice or data services. Generally, wireless networks comprise a number of fixed and geographically distributed transceivers that communicate with the mobile units currently within their coverage areas. The mobile units may be cellular telephones, or they may be wireless modems connected to laptop computers or PDAs. The fixed transceivers typically communicate with a central control unit through a wired or wireless backhaul. While certain small-scale wireless systems may be self-contained, wireless networks are typically connected to the PSTN and may also have a direct connection to the Internet.

In a typical wireless data connection, a wireless modem may be attached to a serial or PCMCIA port of a laptop computer. A cellular telephone system that serves both voice users and data users receives the data signals from the wireless modem and carries them to access points connected to wire systems. Alternatively, a cellular system that is dedicated to data communications may carry the data signals received from the wireless modem.

E. E-Mail in a Wireless Communications Environment

Wireless data networks offer the possibility to combine the mobility of a portable device with the efficiency of e-mail communications. To achieve wireless e-mail connectivity, a user might execute a software application (i.e. a sequence of instructions executable by an array of logic elements such as a processor) which supports e-mail services on a laptop computer equipped with a wireless modem. The wireless modem is then used in the same fashion as a wireline modem, i.e. to provide a connection through the PSTN to the server servicing the user's e-mail account.

More recently, it has become possible to receive and view e-mail using (1) a handheld cellular telephone unit with a display or (2) a handheld personal digital assistant (PDA) connected to a wireless modem. By using the phone keypad, for example, the user may select an option that allows an incoming e-mail message to be retrieved and displayed. After viewing the message, the user may select an option to erase the message or store it in the phone's memory.

However, such handheld products offer very limited functionality to the user who wants to send an e-mail message. Initiating or replying to an e-mail message, presents significant problems to the user of a handheld device, as the device lacks a convenient text input tool such as a typing keyboard. Instead, only limited text input is possible with the use of the phone's numeric keypad. Consider a user who wishes to input the word "ACE." The '2' key on the phone keypad is associated with three letters in the alphabet, namely, A, B, and C, while the '3' key is associated with the letters D, E, and F. To input the word ACE using the phone keypad, the user first presses the '2' key once. The letter A appears on the display. After a brief pause, the user presses the '2' key one more time. The display now reads "AA." To get the letter C, the user presses the '2' key twice more in rapid succession. The letter C appears on the display, which now reads "AC." Finally, to enter the letter E, the user presses the '3' key twice in rapid succession. The display now reads "ACE."

As this example demonstrates, the task of entering text using a numeric keypad is very cumbersome. The small size of the wireless phone, while advantageous in many respects, does not provide a practical way to send e-mail communication. This limitation is shared by other handheld devices, which are necessarily too small for features such as typing keyboards. Even if such a keyboard were to be included with a handheld device, its small size would make it difficult to use. Thus, sending e-mail communications with a handheld device has not been a practical option, especially for long messages or for users who are in transit or driving.

In contrast, the present invention allows the users of handheld wireless communications devices to send e-mail communications in a convenient manner, even while driving or walking down the street. Additionally, users may now send voice messages without incurring the toll charges of a long-distance telephone call or possibly initiating a two-way communication. The invention also provides a way to send image and other non-textual information without any need for cumbersome equipment such as a laptop computer.

SUMMARY OF THE INVENTION

A novel method and apparatus are disclosed for using a handheld wireless communications device to create a voice, image, or video file and forward it to a recipient as an attachment to an e-mail message. In one embodiment, a software (or firmware) application running on the handheld device forwards the data to a server integrated into the wireless network, and the server formats the e-mail message and forwards it to the recipient over a data communications network such as the Internet. In another embodiment, the handheld device formats the e-mail message and transmits it to a server integrated into or external to the wireless network, which server forwards the message to the recipient.

DETAILED DESCRIPTION OF THE INVENTION

Figure 4:
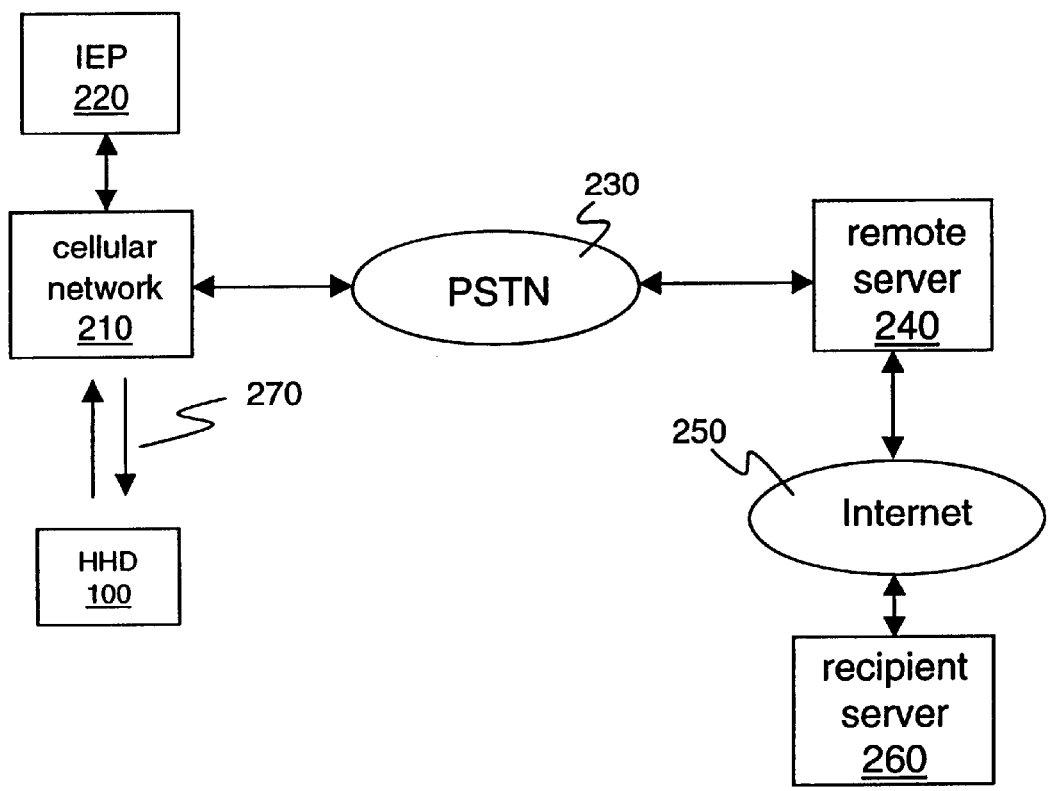
FIG. 4 shows a structure supporting e-mail communications which includes a system according to the first embodiment of the invention.

In a system according to the first embodiment of the invention as shown in FIG. 4, a sender uses a handheld wireless communications device (HHD) 100 to transmit coded data to a cellular network 210 having an integrated e-mail processor (IEP) 220. IEP 220 formats the coded data into an attachment to an e-mail message and forwards the composite message to the remote server 240 on which the sender's e-mail account resides. Server 240 then forwards the e-mail message to the server 260 on which the intended recipient's e-mail account resides (e.g.. by using SMTP over the Internet 250).

Figure 5:
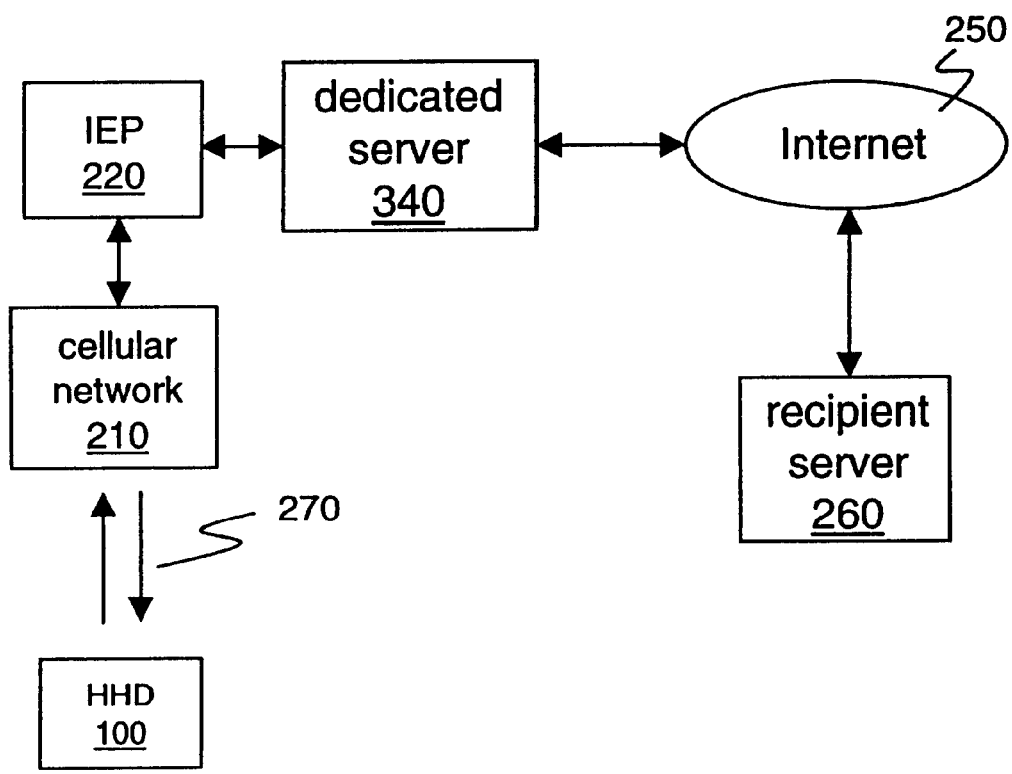
FIG. 5 shows a structure supporting e-mail communications which includes a system according to the second embodiment of the invention.

In a system according to the second embodiment of the invention, as shown in FIG. 5, the server 340 on which the sender's e-mail account resides is dedicated to the cellular network 210. For example, server 340 may have a direct network connection to cellular network 210 rather than only a connection through the PSTN 230. Alternatively, server 340 may process accounts or messages corresponding to users of the cellular network 210 exclusively or in a different manner from accounts or messages corresponding to other users.

F. Preparation of E-Mail Message

Figure 1:
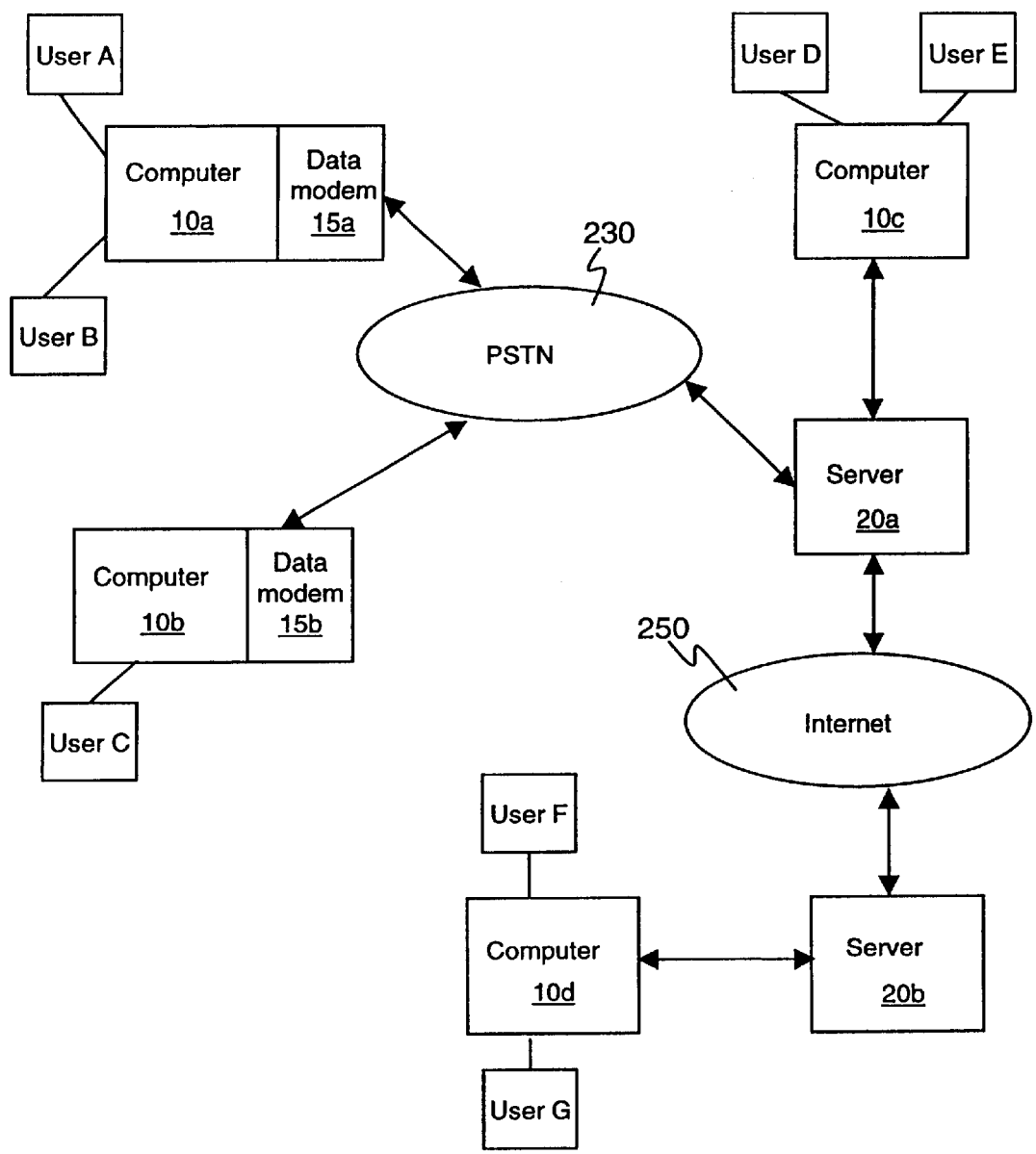
FIG. 1 shows a block diagram of a structure supporting e-mail communications.
Figure 2A:
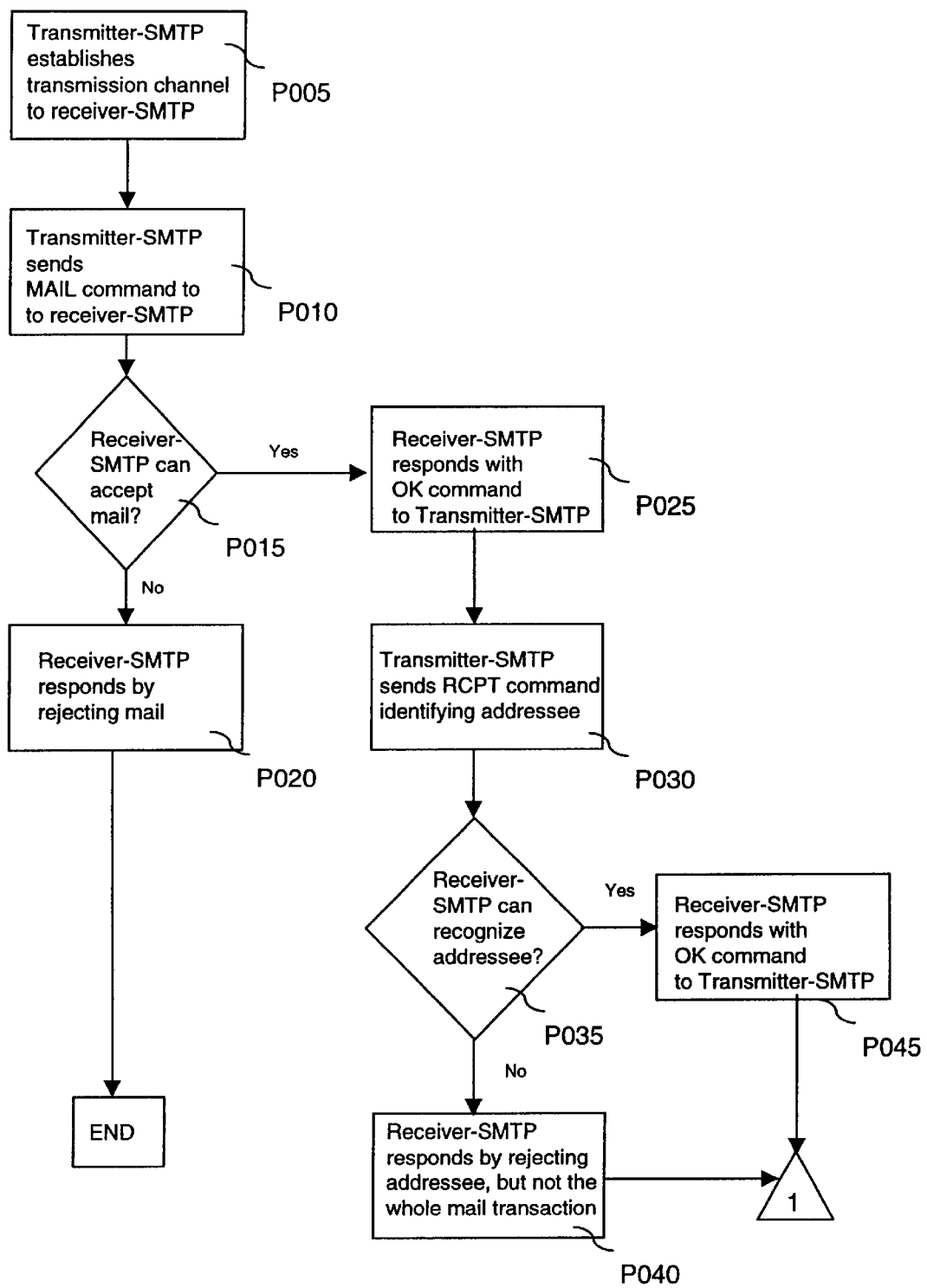
FIGS. 2A and 2B depict the flow of information using the Simple Mail Transfer Protocol (SMTP).
Figure 2B:
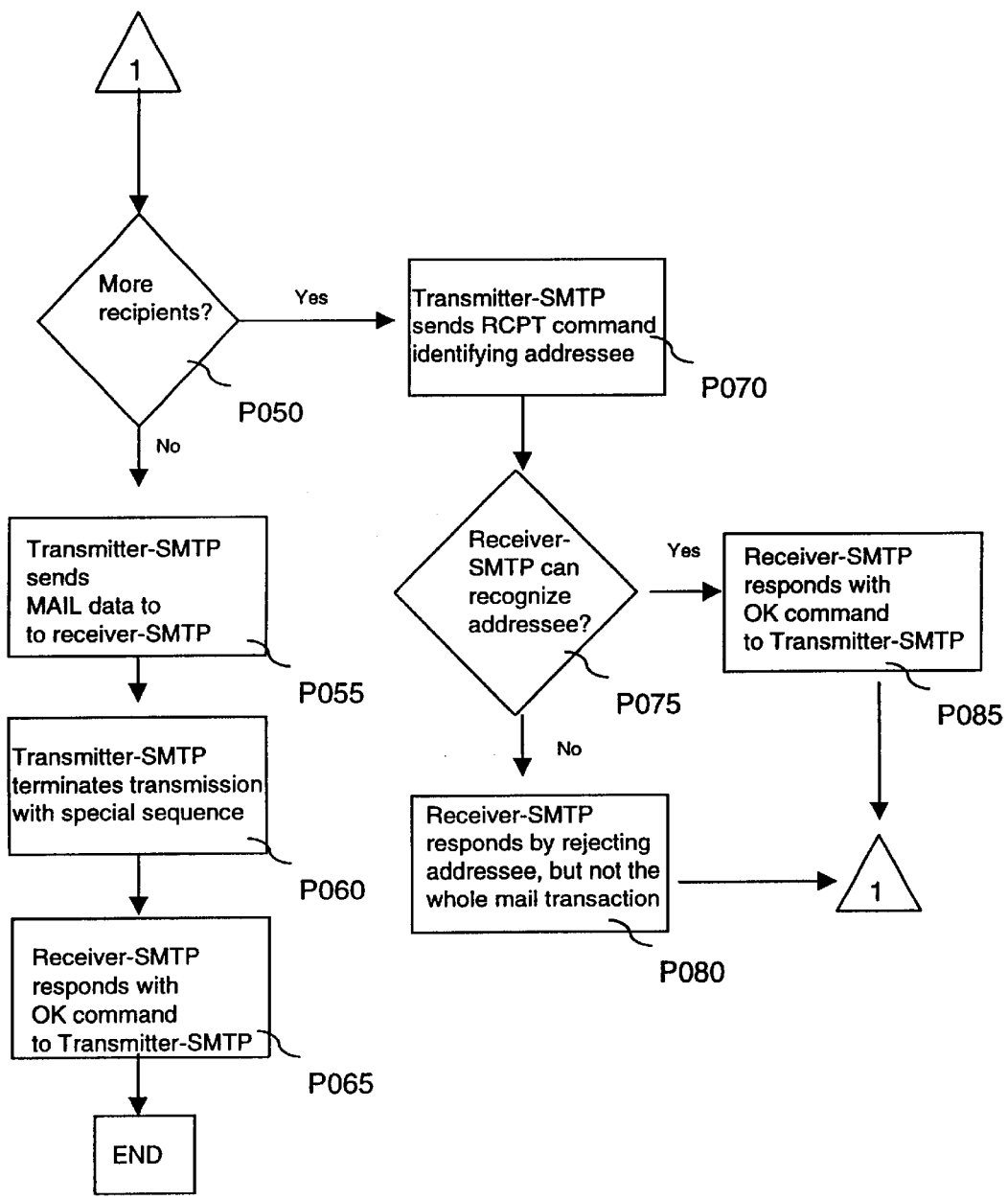
Figure 3:
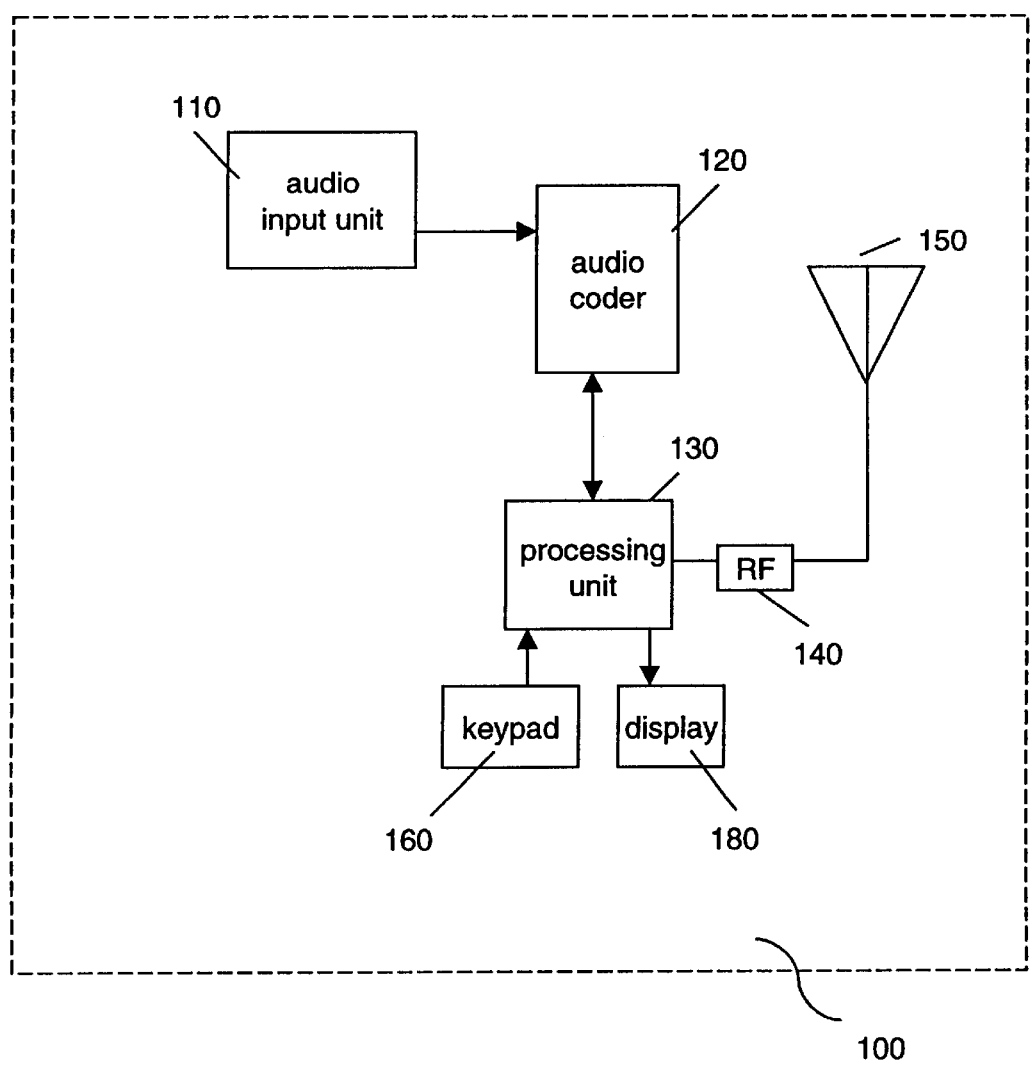
FIG. 3 shows a functional block diagram of a handheld wireless communications device (HHD) suitable for use in a system according to first or second embodiments of the invention.
Figure 7:
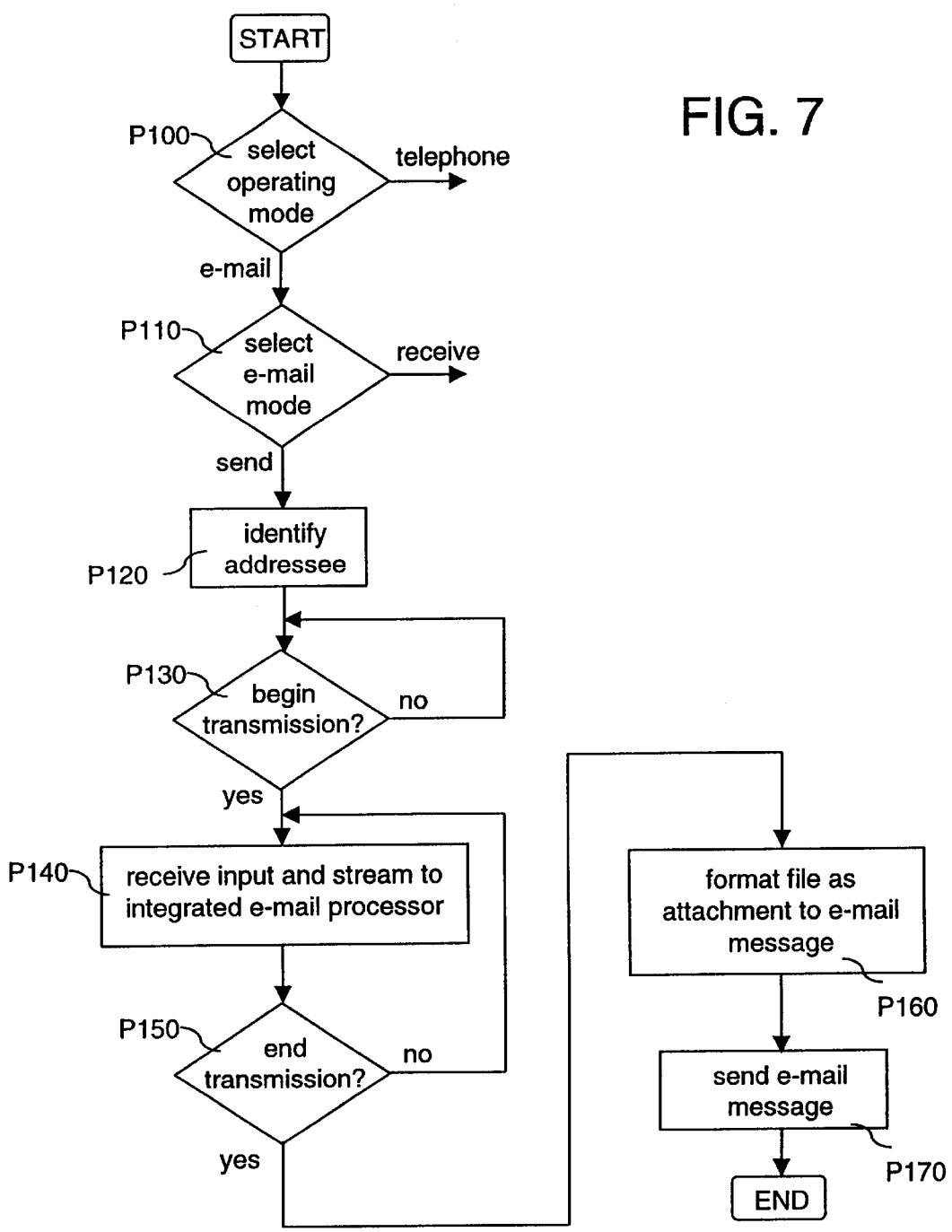
FIG. 7 is a flowchart of a method according to the first or second embodiments of the invention.

FIG. 3 shows a functional block diagram of a handheld wireless communications device (HHD) 100 that may be used in carrying out a method of communicating by e-mail according to a first embodiment of the invention. As shown in the flowchart of FIG. 7, the first task P100 in this method is to select the operating mode for the HHD 100. In order to select an operating mode, the sender enters a predetermined keystroke or sequence of keystrokes via keypad 160. According to these keystrokes (or the lack of such keystrokes), processing unit 130 causes HHD 100 to enter the selected mode of operation or a default mode. For example, if HHD 100 has cellular telephone capability and normal telephone operation has been selected (e.g. by default), HHD 100 establishes a telephone service connection with cellular network 210 of FIG. 5 over a wireless link 270. Voice or audio input received by HHD 100 through audio input device 110 (e.g. a microphone) is then encoded by audio coder 120 (e.g. a vocoder) under the control of processing unit 130. The coded data is formatted by processing unit 130 for transmission as a telephone call, upconverted and amplified in RF stage 140, and transmitted over antenna 150.

When an e-mail operation mode is selected or otherwise indicated, the next task P110 is to establish whether the user wishes to send or to receive e-mail. As with task P100, processing unit 130 causes HHD 100 to enter the selected mode of operation or a default mode, in response to the presence or absence of a predetermined keystroke or sequence of keystrokes on keypad 160.

If a 'send e-mail' mode is indicated, the next task P120 is to identify the addressee(s) or recipient(s) of the e-mail message. If an incoming e-mail message has just been reviewed, the sender may choose to send a reply to the sender of that message and/or to any of the other recipients of the message. Otherwise, as e-mail addresses are typically fairly short, one viable option is for the sender to enter the entire address using keypad 160. In a further option, a speech-to-text conversion engine is provided (i.e. as a part of processing unit 130) so that the sender may speak the e-mail address letter-by-letter; each spoken letter is then converted into the appropriate character.

Alternatively, the sender may choose one or more e-mail addresses from a list stored in HHD 100 (i.e. an 'address book'). It is preferable to store such information in a nonvolatile medium such as flash memory, EEPROM (electrically erasable programmable read-only memory), or another form of NVRAM (nonvolatile random-access memory); a low-power semiconductor memory unit with battery backup; or a magnetic medium. The addresses in this list may be displayed on a display 180 of HHD 100 in a numerical order or in an alphabetic order. In the latter case, the list displayed may be narrowed automatically as each letter of the address is entered until only one possible choice remains, thereby relieving the user from having to enter the entire address.

As the coded data will be attached to or otherwise incorporated into an e-mail message, it will be necessary either to supply a precomposed base e-mail message or to generate a base e-mail message. The same default message may be used as a base for all such messages, or a particular base message may be chosen from among a list of such messages stored on HHD 100 (i.e. a 'message book'). For example, one message on this list, designed for business communications, may bear the sender's letterhead, office address, phone number, and/or fax number. Another message on this list may be designed for personal communications, bearing the sender's personal information instead. Again, it is preferable to store such information in a nonvolatile medium as described above. In one implementation, a communications port is provided on HHD 100 to allow addresses and messages to be compiled or composed on a personal computer and loaded into the address and/or message books of HHD 100. In another implementation, the base message generation and/or storage is performed within IEP 220.

In tasks P130–P150, HHD 100 establishes a wireless data link 270 with cellular network 210 of FIG. 5, instructs the network that coded data for an e-mail attachment is forthcoming, and sends and completes the transmission. Once the data link is established, the audio input process is initiated by HHD 100 (as in block P130), this event being indicated to the sender by a visual or audio signal. Alternatively, the sender may initiate the input process by, e.g., entering the appropriate keystroke(s) on keypad 160. It is preferable for processing unit 130 to cause HHD 100 to issue a blinking light or similar signal as an indication to the user that the audio input process is ongoing (as in block P140).

As the audio input is received from audio input unit 110, it is coded in audio coder 120, formatted by processing unit 130, and transmitted to cellular network 210 over data connection 270. It is possible that the format imposed on the audio input by processing unit 130 may be the same as the format used for transmission of a telephone call; alternatively, processing unit 130 may send the data using a scheme such as the real-time transport protocol (RTP) instead. RTP, a protocol for carrying data with real-time characteristics, is defined in RFC 1889, "RTP: A Transport Protocol for Real-Time Applications," by H. Schulzrinne, S. Casner, R. Frederick, and V. Jacobson, University of Southern California/Information Sciences Institute. Transmission of the real-time data continues until a predetermined time limit has expired or until the sender ends the process by, e.g., entering the appropriate keystroke(s) on keypad 160 (as in block P150).

In multiple-access systems it is usually desirable to minimize bandwidth use. In order to conserve bandwidth, therefore, the wireless data link 270 will typically be terminated when transmission of the real-time data has completed. Processing unit 130 may also terminate the link if no audio input has been detected for some predetermined period. Note that at some point while wireless data link 270 is active, however, it is necessary for HHD 100 to forward to IEP 220 any information needed to identify the addressee(s) and the base message to be used. Forwarding of this information may occur at any time while link 270 is active, so long as it does not interfere with the transmission of the input data, and it will typically occur either before processing unit 130 begins the task of transmitting the formatted data to cellular network 210 or after this task has completed.

Upon receiving the message data, cellular network 210 forwards it to integrated e-mail processor (IEP) 220 to be attached to or otherwise incorporated into an e-mail message. Before this processing task may be performed, it may be necessary to format the message data into a data file. Depending on the nature of the file format used, formatting of the message data into a data file may occur in HHD 100, at IEP 220, or at both locations. For example, if the formatting requires only such predetermined and localized steps as adding a fixed header and/or trailer to the data, or coding adjacent blocks of data into another form, the formatting may be done by HHD 100, assuming that sufficient processing and storage capacity is available. In this case, it remains only for IEP 220 to collect the transmitted data into a file (as in block P160).

On the other hand, if the formatting is global or variable in nature, requiring knowledge of the entire set of data that will be included in the file, then the formatting must be performed at IEP 220, as HHD 100 will typically lack the processing capacity to perform such a task and/or the storage capacity required to hold the entire set of data at one time. For audio data files in a RIFF or related format (such as WAV), the file header includes a field indicating of the length of the file. Because the length of the input message cannot be determined until the entire message has been entered by the user, it may not be possible for HHD 100 to provide the header of such a file. For some formats, a hybrid alternative may exist wherein, for example, HHD 100 performs local data processing to transmit the data in a particular format, and IEP 220 calculates the global parameters and merges them with the data format as required.

Once the formatting of the data file is completed, IEP 220 completes the composite e-mail message by attaching or incorporating the data file into the base e-mail message as necessary (as in block P160). In one implementation, incorporation of the data file into the composite message may be executed concurrently with the formatting process. In another implementation, the incorporation process is delayed to facilitate sending a modified composite message (i.e. one having additional attachments and/or omitting one or more of the original attachments) to other recipients. Once the e-mail message is completed, it is forwarded to the server where the user's e-mail account resides for transmission to the recipient (as in block P170).

Figure 6:
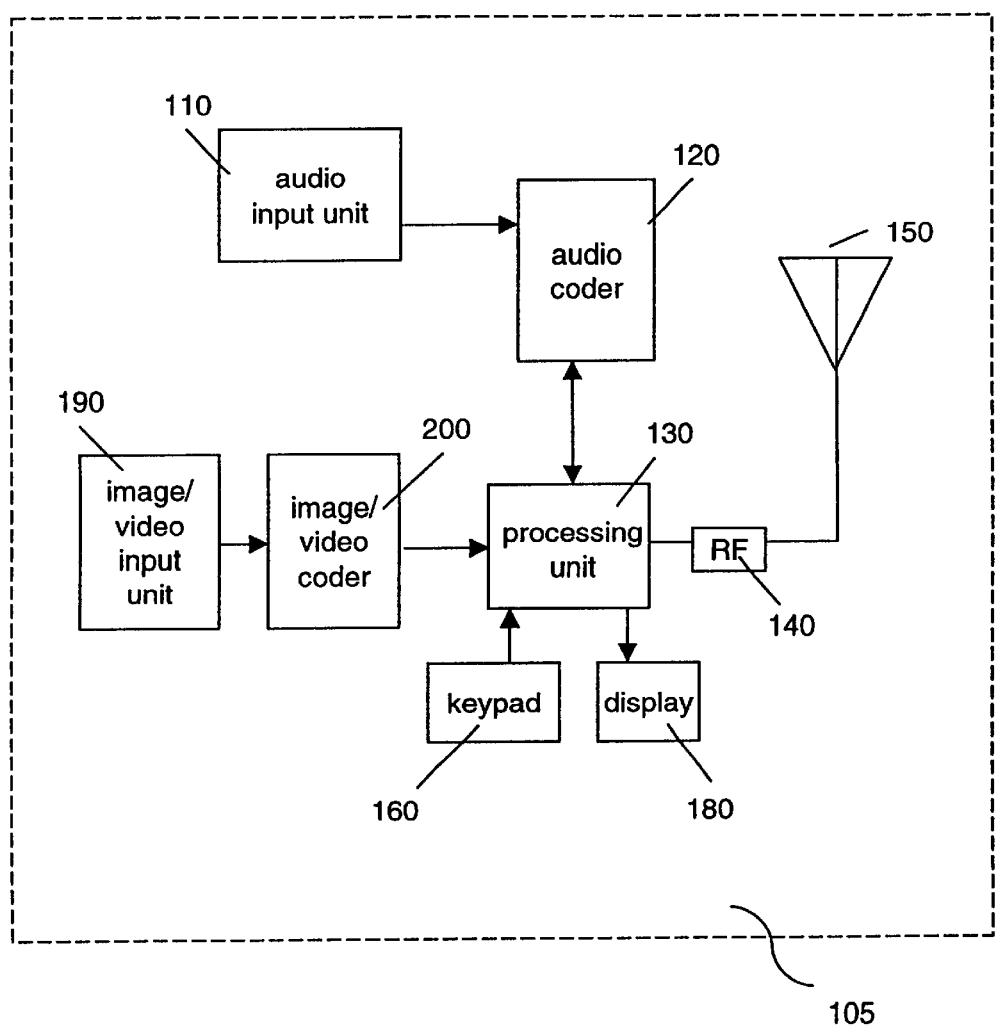
FIG. 6 shows a functional block diagram of a HHD capable of receiving images and suitable for use in a system according to the first or second embodiments of the invention.

Note that the invention is not limited to the attachment of audio data. For example, HHD 105 as shown in FIG. 6 may be equipped with an image/video input unit 190 such as a camera to enable the e-mail transmission of image or video data. In this case, a suitable image/video coder 200 is also provided in HHD 105.

Figure 8:
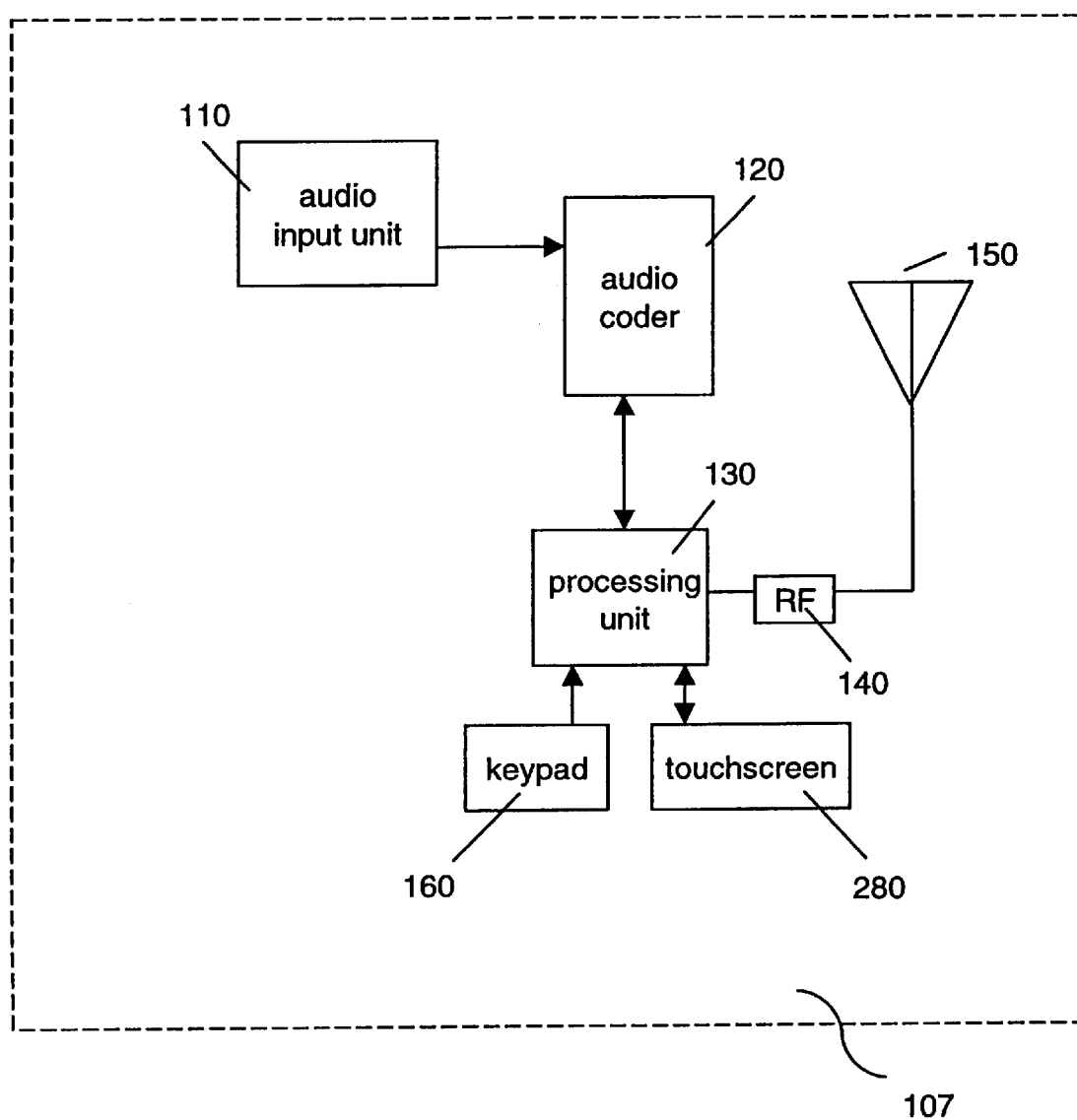
FIG. 8 shows a functional block diagram of a HHD having a touchscreen and suitable for use in a system according to the first or second embodiments of the invention.

In an alternative implementation as shown in FIG. 8, HHD 107 is provided with a touchscreen 280 for providing an interactive display interface. Touchscreen 280 may be used for selection of such control items as telephone function (e.g. telephone, e-mail receive, e-mail send) or for selection of data items such as an addressee or a base e-mail message from the address or message books. Other input means, such as recognition of simple voice commands such as 'Send' and selections such as 'Four,' may also be supported within the HHD.

In order to provide enhanced services to the sender, certain storage functions may be performed by IEP 220 rather than within the HHD. For example, some portion of storage within IEP 220 may be reserved for the sender's message and/or address book. Note that more wireless bandwidth may be consumed in this case, as the information must be echoed to the HHD for display so that the sender can make her selection. However, this method may enable the system to support functions requiring more storage than is available within the HHD. In a hybrid alternative, most of the base e-mail message may be stored on IEP 220, with only a small amount of personalizing information to complete it being stored by the HHD and forwarded over cellular network 210.

In the same way, certain processing functions may be performed by IEP 220 rather than by processing unit 130. For example, speech-to-text conversion for e-mail address input may be performed within IEP 220 from audio input forwarded by HHD 100. Also, much of the control of the e-mail process may be done by IEP 220 instead of by processing unit 130, with IEP 220 forwarding display menu information to HHD 100 and receiving the sender's selection in a return transmission. As with the storage alternative mentioned above, however, this method may consume more of the bandwidth of wireless link 270.

G. Transmission of E-Mail Message

In order to allow the sender to replay or echo the message data before e-mail transmission and possibly to cancel the transmission, it is preferable not to begin transmission of the composite e-mail message until the sender has confirmed this operation. In a system according to the first embodiment of the invention, IEP 220 then forwards the composite e-mail message to remote server 240. Server 240 is external to the cellular network 210 and is the server on which the sender's e-mail account resides. For example, the sender's e-mail account may reside on the server of an Internet Service Provider (ISP). IEP 220 and server 240 are connected primarily through the PSTN 230; cellular network 210 may be an intermediate point in this connection, as shown in FIG. 4, or IEP 220 may be connected directly to the PSTN 230.

In order to establish the connection between IEP 220 and server 240, it may be necessary for IEP 220 to negotiate an authentication process in order to obtain access to (i.e. log in to) the sender's account on server 240. If several messages are to be sent by the same sender, it is preferable to store these messages locally at IEP 220 if possible so that they may be transmitted consecutively in a single session, thereby requiring only one authentication negotiation. For example, one technique to accomplish this feature is to store the sender's messages locally at IEP 220 until the sender's HHD closes its connection to cellular network 210.

As a further option, HHD 100 may establish a connection to server 240 by executing a web browser application. In such a system, the user may log into its account on server 240 through the web browser. To send a voice message, the sender may record a voice message, use the web browser or another application to attach the voice message to an e-mail message, and then use the browser to send the composite e-mail message to server 240.

To complete the e-mail transmission, remote server 240 forwards the composite e-mail message over the Internet 250 to the appropriate recipient server 260, as it would do with any other e-mail message originating from the sender's account.

In a method according to the second embodiment of the invention, the sender's e-mail account is on a server 340 dedicated to the cellular network. In this case, dedicated server 340 may be the same unit as IEP 220. Using a dedicated server makes it possible to avoid the necessity of an authentication process. It is also possible to store the sender's address book, message book, and/or other personalizing information in storage space reserved for the sender's use on server 340. Additionally, as described above with respect to support provided by IEP 220, it is possible for dedicated server 340 to provide processing support to processing unit 130 as well.

H. Further Embodiments

Figure 9:
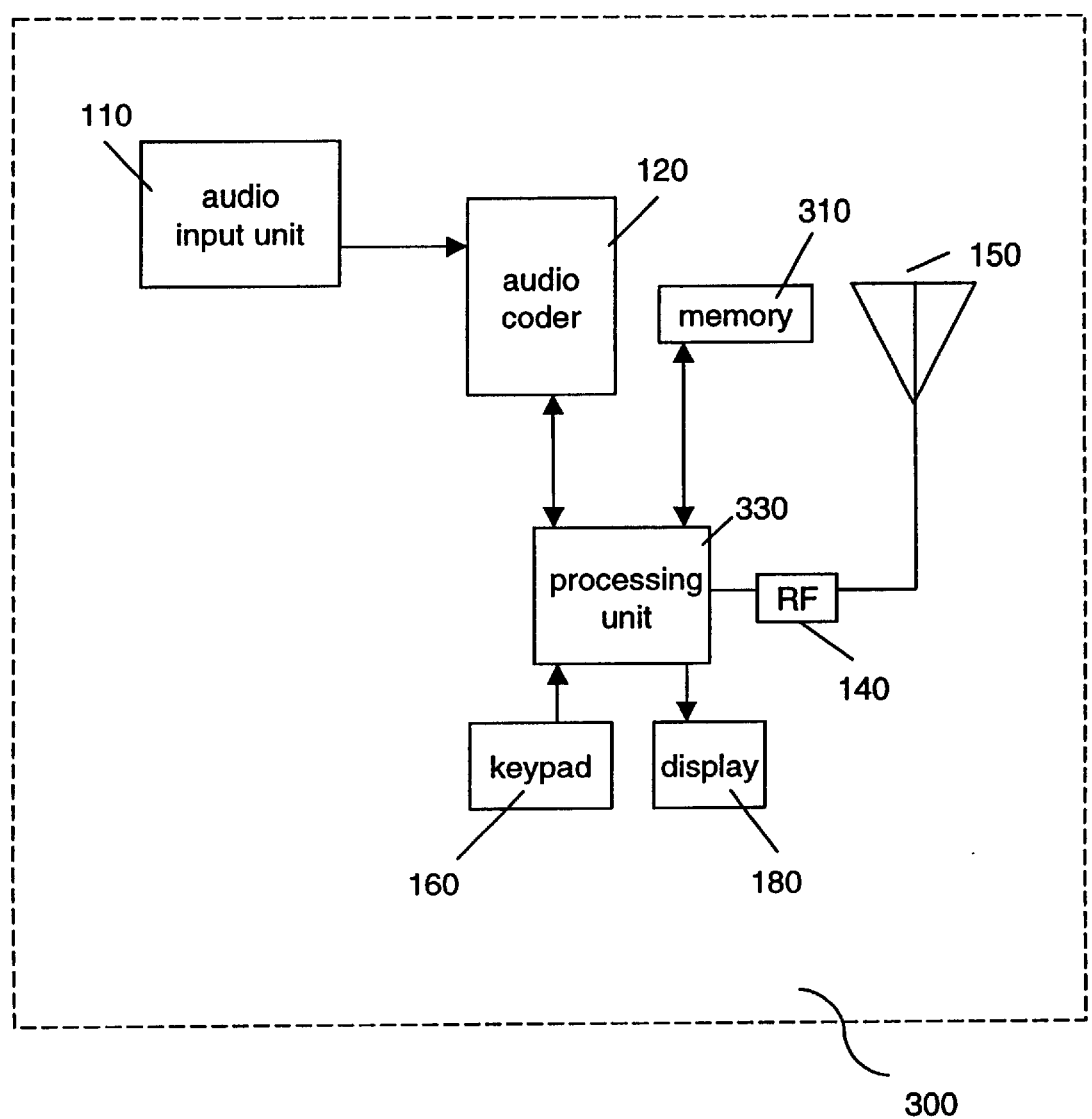
FIG. 9 shows a functional block diagram of a HHD suitable for use in a system according to third or fourth embodiments of the invention.

In a system according to a third embodiment of the invention, the coded data is incorporated into a composite e-mail message before being transmitted to cellular network 210 over wireless link 370. As shown in FIG. 9, sufficient storage and processing capacity is provided within enhanced HHD 300 to support this functionality, wherein processing unit 330 assembles the coded data and the base e-mail message into a composite e-mail message as described in relation to IEP 220 above. In this case, memory 310 provides the storage necessary to retain the coded data and produce the composite e-mail message.

Figure 10:
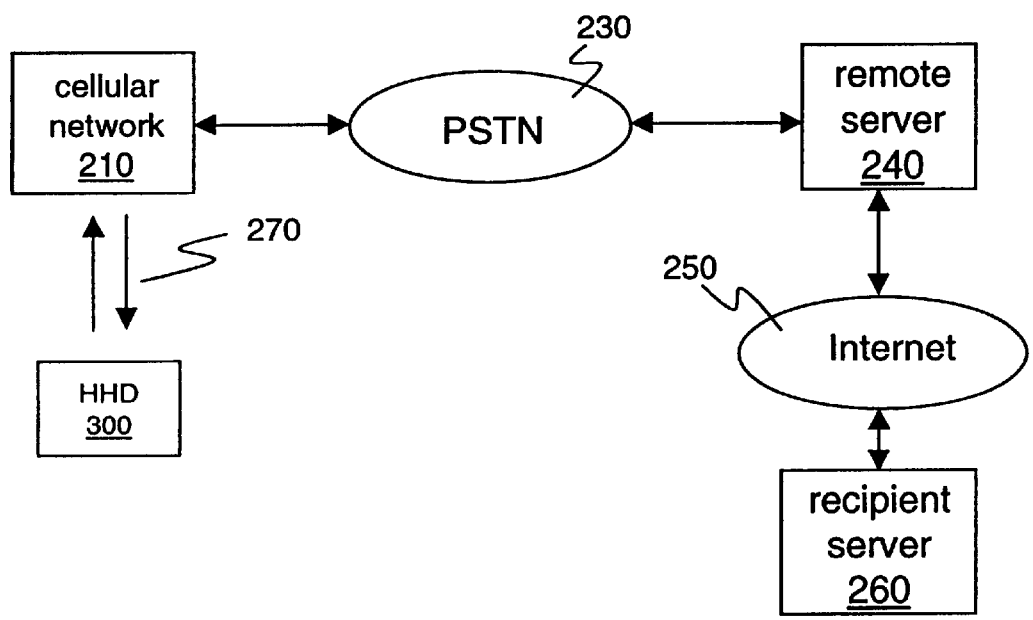
FIG. 10 shows a structure supporting e-mail communications which includes a system according to the third embodiment of the invention.

As illustrated in FIG. 10, the composite e-mail message is transmitted from handheld device 300 to remote server 240 via wireless link 370, cellular network 210 and the PSTN 230. For example, the e-mail transmission may occur via SMTP over a Transport Control Protocol (TCP) connection between the handheld device 300 and the remote server 240. As above, communication between the cellular network 210 and the remote server 240 occurs primarily through the PSTN 230.

Note that assembling the composite e-mail message within handheld device 300 allows IEP 220 to be eliminated from the system. Therefore, any cellular telephone network may be used in such a system, whether analog or digital, so long as data traffic may be carried on wireless link 370 via either direct transmission of data or via transmission of data over a voice connection using a modem.

Figure 11:
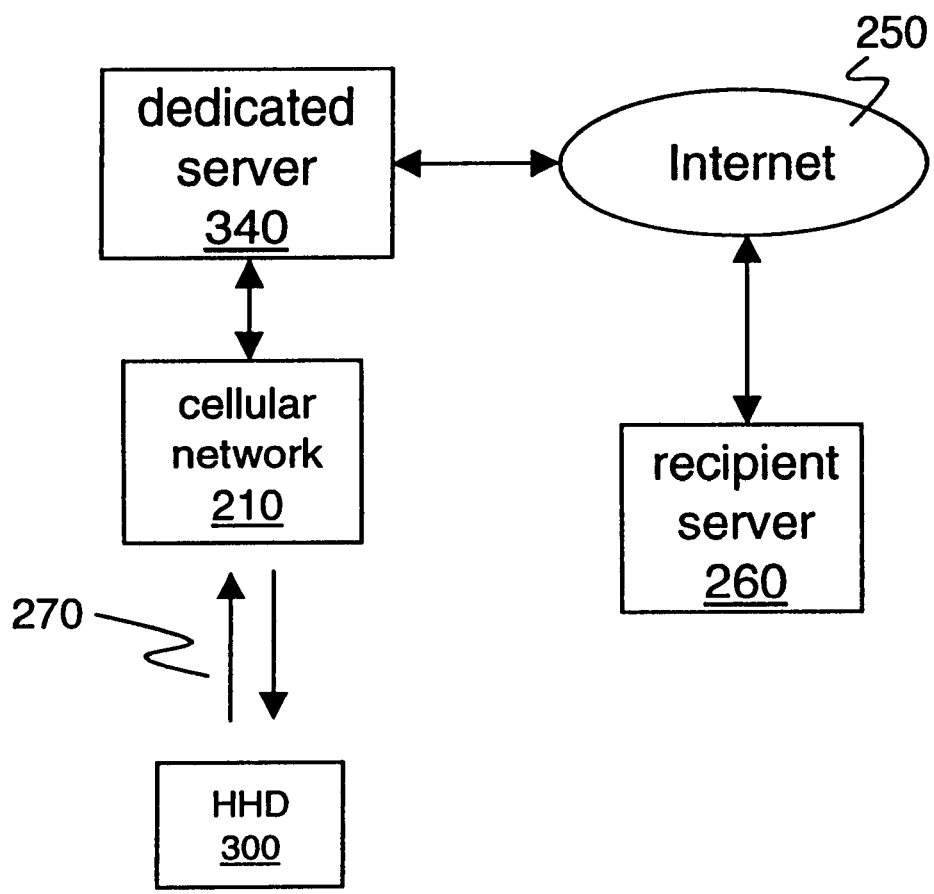
FIG. 11 shows a structure supporting e-mail communications which includes a system according to the fourth embodiment of the invention.

In a system according to a fourth embodiment of the invention, as shown in FIG. 11, the user sends the composite e-mail message using an e-mail account on a server 340 which is dedicated to the cellular network.

The foregoing description of the preferred embodiments is provided to enable any person skilled in the art to make or use the present invention. Various modifications to these embodiments are possible, and the generic principles presented herein may be applied to other embodiments as well. For example, the invention may be implemented in part or in whole as hard-wired circuits, as circuit configurations fabricated into application-specific integrated circuits, or as firmware programs loaded into non-volatile storage or software programs loaded from or into data storage media as machine-readable code, such code being instructions executable by arrays of logic elements such as microprocessors or other digital signal processing units. The invention may also be implemented in a data storage medium which includes a set of several media having different forms.

Likewise, implementation of the invention is not limited to handheld wireless communication devices and may be extended to wearable devices and other such devices too small to properly accommodate typing keyboards. Thus, the present invention is not intended to be limited to the embodiments shown above but rather is to be accorded the widest scope consistent with the principles and novel features disclosed in any fashion herein.

We claim:

1. A method comprising:

receiving input data via at least one input unit of a wireless communications device as directed by a user;

encoding the input data to obtain coded data;

transmitting a signal from the wireless communications device to a cellular network, the signal being based at least in part on the coded data;

composing an electronic mail ('e-mail') message from a base message and attachment data, the attachment data being based at least in part on the coded data; and sending the e-mail message to a server, wherein the input data comprises at least one among audio data and image data and at least a portion of the e-mail message is echoed by the cellular network to the wireless communication device before sending of the e-mail message commences.

2. The method according to claim 1, wherein the cellular network comprises an integrated e-mail processor, and wherein composing the e-mail message is performed substantially by the integrated e-mail processor.

3. The method according to claim 2, wherein sending the e-mail message is performed at least in part using SMTP.

4. The method according to claim 2, wherein sending the e-mail message occurs at least in part over the public switched telephone network.

5. The method according to claim 2, wherein the server has a direct network connection to the cellular network.

6. The method according to claim 2, wherein a recipient of the e-mail message is selected by the user from among an addressee list stored on the integrated e-mail processor, the addressee list comprising e-mail addresses.

7. The method according to claim 2, wherein the base message is generated at least in part by the integrated e-mail processor.

8. The method according to claim 2, wherein at least a portion of the base message is selected by the user from among a message list stored on the integrated e-mail processor, the message list comprising at least portions of e-mail messages.

9. The method according to claim 2, wherein the integrated e-mail processor comprises storage, and wherein at least a portion of said storage is reserved for use by the user.

10. The method according to claim 2, wherein transmitting a signal from the wireless communications device to the cellular network occurs at least in part through a web browser application executing on the wireless communications device.

11. The method according to claim 2, wherein the server is dedicated to the cellular network.

12. The method according to claim 11, wherein at least a portion of the e-mail message is echoed by the cellular network to the wireless communication device before sending of the e-mail message commences.

13. The method according to claim 2, wherein the server processes e-mail messages received from the cellular network in a different manner from other e-mail messages.

14. The method according to claim 13, wherein at least a portion of the e-mail message is echoed by the cellular network to the wireless communication device before sending of the e-mail message commences.

15. The method according to claim 2, wherein composing an e-mail message consists of attaching said attachment data to said base message, and wherein transmitting a signal from a wireless communications device to a cellular network occurs before said composing is completed.

16. The method according to claim 2, wherein composing an e-mail message consists of attaching said attachment data to said base message, and wherein transmitting a signal from a wireless communications device to a cellular network occurs before said composing has begun.

17. The method according to claim 1, wherein the server is dedicated to the cellular network.

18. The method according to claim 17, wherein at least a portion of the e-mail message is echoed by the cellular network to the wireless communication device before sending of the e-mail message commences.

19. The method according to claim 1, wherein the server processes e-mail messages received from the cellular network in a different manner from other e-mail messages.

20. The method according to claim 19, wherein at least a portion of the e-mail message is echoed by the cellular network to the wireless communication device before sending of the e-mail message commences.

21. The method according to claim 1, wherein composing an e-mail message consists of attaching said attachment data to said base message, and wherein transmitting a signal from a wireless communications device to a cellular network occurs before said composing is completed.

22. The method according to claim 1, wherein composing an e-mail message consists of attaching said attachment data to said base message, and wherein transmitting a signal from a wireless communications device to a cellular network occurs before said composing has begun.

23. A data storage medium having instructions stored thereon, said instructions being executable by an array of logic elements and defining a method comprising:

receiving input data via at least one input unit of a wireless communications device as directed by a user;

encoding the input data to obtain coded data;

transmitting a signal from the wireless communications device to a cellular network, the signal being based at least in part on the coded data;

composing an electronic mail ('e-mail') message from a base message and attachment data, the attachment data being based at least in part on the coded data; and sending the e-mail message to a server, wherein the input data comprises at least one among audio data and image data and at least a portion of the e-mail message is echoed by the cellular network to the wireless communication device before sending of the e-mail message commences.

24. The medium according to claim 23, wherein at least a portion of the e-mail message is echoed by the cellular network to the wireless communication device before sending of the e-mail message commences.

25. The medium according to claim 23, wherein the cellular network comprises an integrated e-mail processor, and wherein composing the e-mail message is performed substantially by the integrated e-mail processor.

26. The medium according to claim 23, wherein the server processes e-mail messages received from the cellular network in a different manner from other e-mail messages.

27. The medium according to claim 23, wherein composing an e-mail message consists of attaching said attachment data to said base message, and wherein transmitting a signal from a wireless communications device to a cellular network occurs before said composing is completed.

28. A system comprising:

a wireless communications device, said device comprising (1) at least one input unit for receiving input data, (2) a processing unit for encoding the input data, and (3) an RF stage for transmitting a signal based at least in part on the coded data; and a cellular network for receiving the signal, wherein said cellular network comprises an integrated e-mail processor, and wherein the input data comprises at least one among audio data and image data, and wherein at least one among the wireless communications device and the cellular network composes an e-mail message from a base message and attachment data, the attachment data being based at least in part on the coded data and wherein at least a portion of the e-mail message is echoed by the cellular network to the wireless communication device before sending of the e-mail message commences.

29. The system according to claim 28, wherein at least a portion of the e-mail message is echoed by the cellular network to the wireless communication device before sending of the e-mail message commences.

30. The system according to claim 28, wherein the server processes e-mail messages received from the cellular network in a different manner from other e-mail messages.

31. The system according to claim 28, wherein composing an e-mail message consists of attaching said attachment data to said base message, and wherein transmitting a signal from a wireless communications device to a cellular network occurs before said composing is completed.

32. An apparatus comprising:

means for receiving input data as directed by a user;

means for encoding the input data to obtain coded data;

means for transmitting a signal to a cellular network, the signal being based at least in part on the coded data;

means for composing an electronic mail ('e-mail') message from a base message and attachment data, the attachment data being based at least in part on the coded data; and means for sending the e-mail message to a server, wherein the input data comprises at least one among audio data and image data and at least a portion of the e-mail message is echoed by the cellular network before sending of the e-mail message commences.

* * * * *